(12) United States Patent
Nicolai et al.

(10) Patent No.: US 6,206,211 B1
(45) Date of Patent: Mar. 27, 2001

(54) FRAME PIECE FOR A RACK OF A SWITCHING CABINET

(75) Inventors: Walter Nicolai, Buseck; Udo Münch, Sinn; Georg Vogel, Schwieberdingen, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/294,767

(22) Filed: Apr. 19, 1999

(30) Foreign Application Priority Data

Apr. 20, 1998 (DE) .............................. 198 18 603

(51) Int. Cl.[7] ...................................... A47F 5/00
(52) U.S. Cl. ........................ 211/183; 211/26; 211/189; 211/182; 312/257.1; 312/265.1; 361/829
(58) Field of Search ............................. 211/26, 189, 182; 312/265.1, 265.2, 265.3, 265.4, 257.1; 361/829

(56) References Cited

U.S. PATENT DOCUMENTS

| 4,643,319 | * | 2/1987 | Debus et al. ............ 211/189 |
| 5,202,818 | * | 4/1993 | Betsch et al. .................... 211/189 X |
| 5,749,476 | * | 5/1998 | Besserer et al. .......................... 211/26 |
| 5,761,797 | * | 6/1998 | Besserer et al. ................. 361/829 X |
| 5,806,946 | * | 9/1998 | Benner et al. .................... 312/265.3 |
| 5,930,972 | * | 8/1999 | Benner et al. ..................... 211/26 X |
| 5,992,646 | * | 11/1999 | Benner et al. ......................... 211/26 |
| 6,030,063 | * | 2/2000 | Benner ............... 211/26 X |
| 6,062,664 | * | 5/2000 | Benner ............................. 312/265.1 |
| 6,070,957 | * | 6/2000 | Zachrai ....................... 312/265.1 X |

* cited by examiner

Primary Examiner—Robert W. Gibson, Jr.
(74) Attorney, Agent, or Firm—Pauley Petersen Kinne & Fejer

(57) ABSTRACT

A frame piece for a rack of a switching cabinet having fastening possibilities, torsional rigidity, material expenditure and manufacture that corresponds to requirements. The frame piece includes a section outside as a connection section between outsides of the rack that contact at right angles. Fastening sections of a section inside are connected to the connection section, which have in a longitudinal direction of the section fastening mounts and transition into section sides having second fastening mounts. The fastening sections are at a first angle to the outsides of the rack and the section sides are at a second angle to the connected fastening section. The fastening sections and the section sides form two inside edges of the section inside.

25 Claims, 4 Drawing Sheets

FRAME PIECE FOR A RACK OF A SWITCHING CABINET

BACKGROUND OF THE INVENTION

1. Field of the Invention

This invention relates to a rack for a switching cabinet.

2. Description of Prior Art

A wide variety of requirements are imposed on a rack of a switching cabinet, all of which must be met by the cross-sectional shape of the employed frame pieces. Frame pieces that deviate in cross-sectional shape of the vertical frame piece can be used in the region of the lower or upper frame. A wide variety of fastening possibilities aligned in several directions are required precisely in the vertically aligned frame pieces of the rack. Optimal strength, preferably torsional rigidity must also be achieved with the least possible material cost for the frame pieces and simple manufacture of the frame piece must nevertheless be possible. Also, in the region of the vertical outside corner edges of the rack sufficient free space must be present to mount the hinge flap of a cabinet door and to form and accommodate sealing elements for the side walls or cabinet back wall being mounted.

A number of frame pieces are known for the rack of a switching cabinet that partly meet the mentioned requirements, but do not offer a satisfactory solution in all respects. Frame pieces designed as open hollow sections perform much more poorly than closed hollow sections.

SUMMARY OF THE INVENTION

It is one object of this invention to provide a frame piece for a rack of a switching cabinet, which has sufficiently high strength for universal fastening possibilities with limited material cost and simple manufacturing, particularly when used as a vertical frame piece and optimally meets the imposed requirements.

This object is solved according to this invention with a frame piece having a section outside as a connection section between the outsides of the rack that meet each other at right angles. The fastening sections of a section interior are connected to the connection section, which have fastening mounts in the section longitudinal direction and also grade into section sides having fastening mounts. The fastening sections are situated in a first angle to the outsides of the rack and the section sides are positioned at a second angle to the fastening section being connected. The fastening sections and section sides form two inside edges of the section interior.

The section outer parts designed as a connection section starting from the outsides of the rack that contact each other at right angles leave sufficient free space in the region of the outer corner edge to meet the requirements for attachment of a cabinet door and for sealing of the side walls, back wall or cabinet door being mounted.

The fastening sections in the section sides of the section internal side have different fastening planes in different directions, in which their alignment with respect to the outsides of the rack can be established with choice of the first and second angles. The torsional rigidity of the frame piece can be optimized and the material expenditure reduced with choice of these angles. Also, the section sides facing each other form a mount opened toward the interior of the rack for attachment of assembly rails, which can expand the variation in fastening possibilities.

The fastening possibilities can be improved because the fastening mounts of the fastening sections have a first identical spacing to the inner edges, and the fastening mounts of the section sides have a second identical spacing to the inside edges.

If the embodiment is simplified so that the first spacings are chosen equal to the second spacings, then uniformly configured assembly rails, attachment parts and the like can be mounted on all fastening planes of the fastening sections and section sides.

The torsional rigidity of the frame piece can be increased by joining the section sides to each other and/or to the connection section.

Incorporation in a rack can be simplified by designing the frame piece as having mirror-image symmetry with respect to the corresponding rack diagonal.

The first and second angles can be chosen as acute, right or obtuse angles so that the fastening planes can be positioned in different directions.

In order to configure the frame piece as a closed hollow section, in one embodiment the section sides are connected to each other directly or via a transition section.

Greater capabilities for selecting the angle between the outside of the rack and the fastening sections and the angle between the section sides and the fastening sections is then allowed with the transition section or direct connection of the section sides to the connection section of the section outer part.

The transition section between the section sides runs parallel to the facing part of the connection section and can be connected to the facing part.

The fastening mounts can be designed as holes and/or square or rectangular openings and extend as rows with uniform spacing in a longitudinal direction of the section. The fastening mounts in the fastening sections and section sides can then differ in design and/or spacing from those in the section sides.

According to one embodiment the alignment of the fastening planes can be laid out so that the fastening sections each run parallel to the section sides not contacted.

If the section internal side has a transition section between the section sides, then for more fastening possibilities, the transition section can have fastening mounts.

The frame piece can be simply produced as a part of an extruded section.

In another manufacturing possibility for the frame piece it is formed as a stamped-bent part, which is preferably joined in the region of the free edges of the section sides or is formed as a stamped-bent part joined in the region of the connection section.

BRIEF DESCRIPTION OF THE DRAWINGS

This invention is further explained with reference to eight practical embodiments of frame pieces shown in the drawings in cross sections as shown in FIGS. 1 to 8.

DESCRIPTION OF PREFERRED EMBODIMENTS

In all practical examples AS1 and AS2 denote two outsides of a rack that contact at right angles, whose rack diagonal RGD is drawn as a bisecting line. The two outsides AS1 and AS2 form an outer corner edge AEK which is not adversely affected, however, by the frame piece with the section outside. The section outside is denoted as connection section 11, which starts from the two outsides AS1 and AS2 and toward the outer corner edge AEK leaves a sufficiently large free space FR for attachment of a cabinet door and sealing and for introduction of the covering elements that contact here, such as side walls, a back wall, and a cabinet door. The connection section 11 can also be configured differently, but always leaves a free space FR for the outer corner edge AEK.

Figure 1:
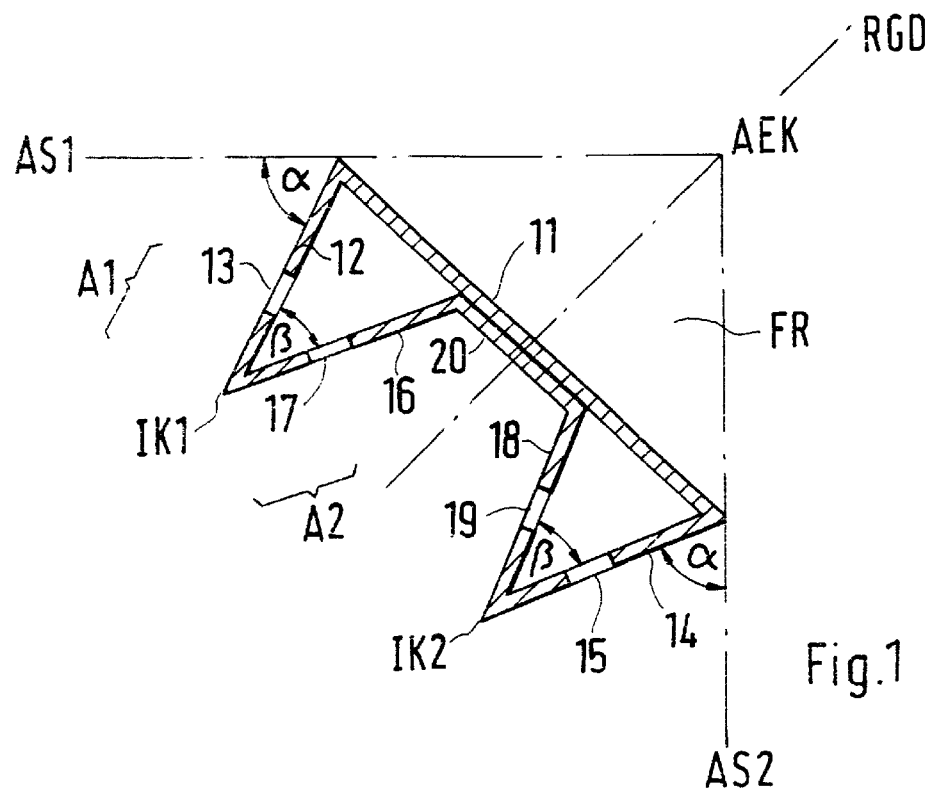

In the practical example according to FIG. 1 the ends of the connection section 11 in the region of outsides AS1 and AS2 transition into fastening sections 12 and 14, which have in the longitudinal direction of the section rows of fastening mounts 13 and 15 and are at an acute angle α to the facing outsides AS1 and AS2. Section sides 16 and 18 are connected to the fastening sections 12 and 14, which also have rows of fastening mounts 17 and 19. The fastening sections 12 and 14 and the section sides 16 and 18 form two inside edges IK1 and IK2. The fastening mounts 13 and 15 of the fastening sections 12 and 14 have a first spacing A1 from the inside edges IK1 and IK2, whereas the fastening mounts 17 and 19 of section strips 16 and 18 have a second spacing A2 from the inside edges IK1 and IK2. The spacing A1, however, can also be chosen equal to the spacing A2. The section sides 16 and 18 enclose an acute angle β with the connected fastening sections 12 and 14. The edges of section sides 16 and 18 facing away from fastening sections 12 and 14 are connected via a transition section 20. The transition section 20 can run parallel to the facing part of the connection section 11 of the section outside and be rigidly connected to the facing part. The transition section 20 can also run at a spacing parallel to the facing part of connection section 11. In a frame piece of this type produced as a stamped-bent part, the transition section 20 can comprise two overlapping end sections, which are connected to section sides 16 and 18. The contact and joining site can also be situated in the region of connection section 11. The fastening mounts 13 and 15 of the fastening sections 12 and 14 can be designed the same and aligned like the fastening mounts 17 and 19 of the section sides 16 and 18. However, the fastening mounts 13 and 15 can also differ in design, alignment and spacing. The angle α can be chosen the same as angle β.

Figure 2:
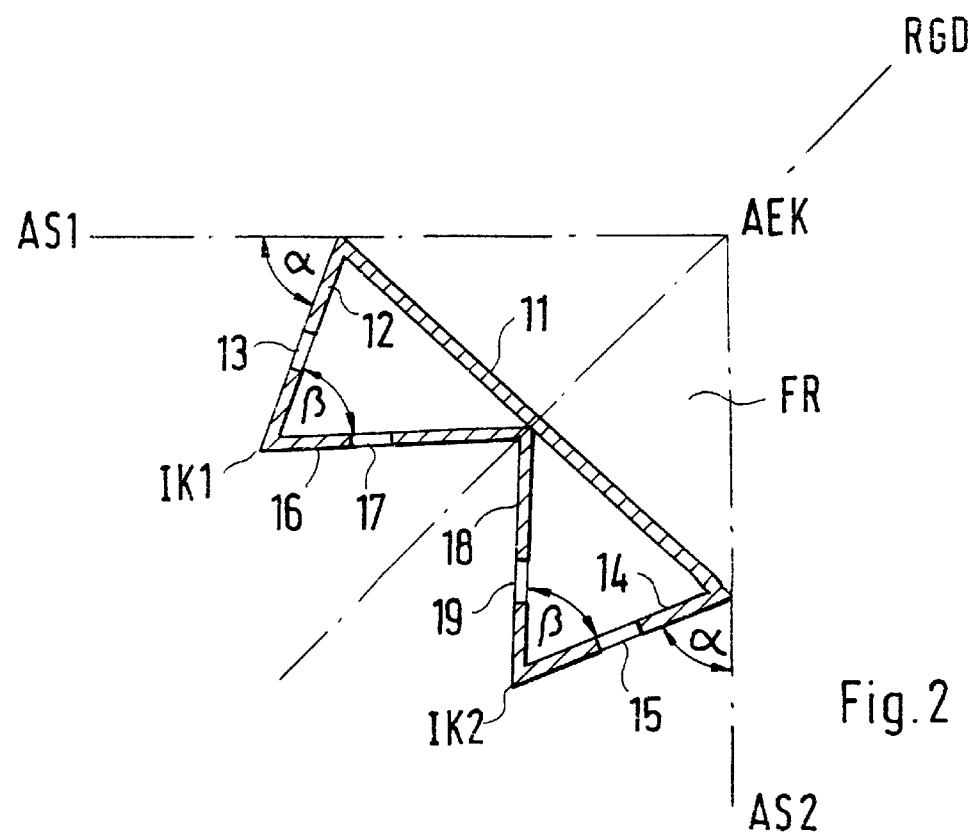

In the frame pieces according to FIG. 2 the angles α and β differ significantly from the practical example according to FIG. 1, since the section sides 16 and 18 are in direct contact and are joined in the center to connection section 11. The frame piece according to FIG. 2 is also designed as having mirror-image symmetry with respect to the rack diagonal RGD. The spacings of the fastening mounts 13 and 17 from the inside edge IK1 correspond to the spacings of the fastening mounts 15 and 19 from the inside edge IK2. By shortening the connection section 11, the free space FR to the outer corner edge AEK can be reduced. The fastening sections 12 and 14 can be the same width as the section side 16 and 18 and half as wide as the connection section 11 so that the two cavities of the frame piece form isosceles or equilateral triangles.

Figure 3:
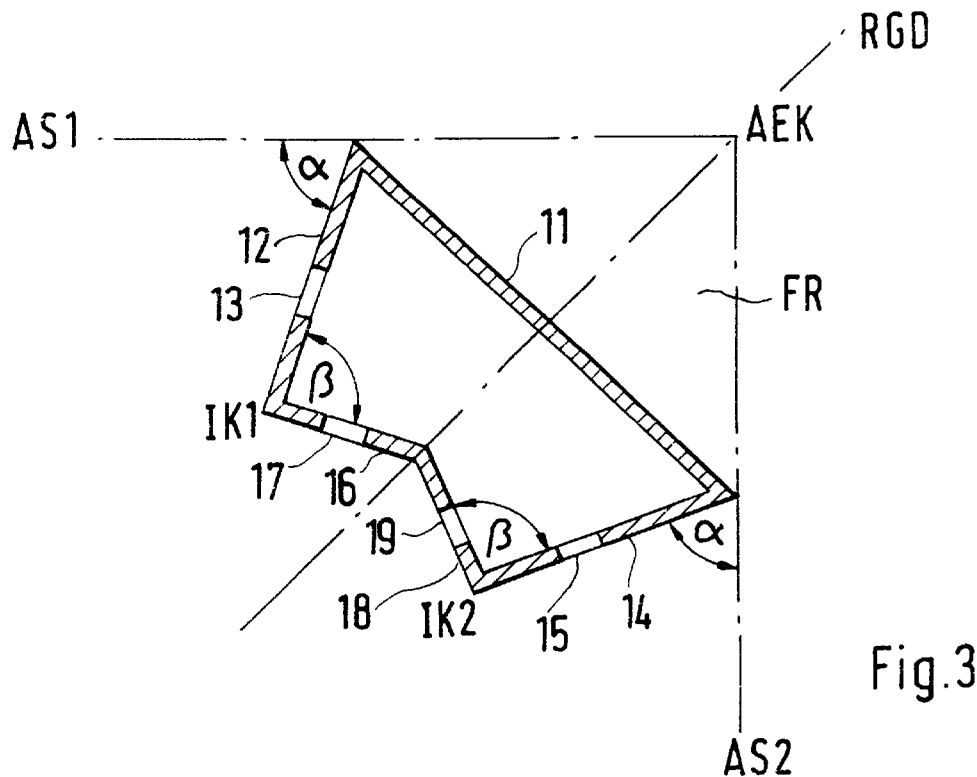

As shown with reference to the practical example according to FIG. 3, the section sides 16 and 18 can also be directly connected to one another at a spacing from connection section 11. In a frame piece starting as a stamped-bent part of this type it is recommended that the contact and joining site be positioned in the region of the connection section 11. The angle α can be chosen as an acute angle and angle β as an obtuse angle. The spacings A1 and A2 of the fastening mounts from the inside edges IK1 and IK2 are different.

Figure 4:
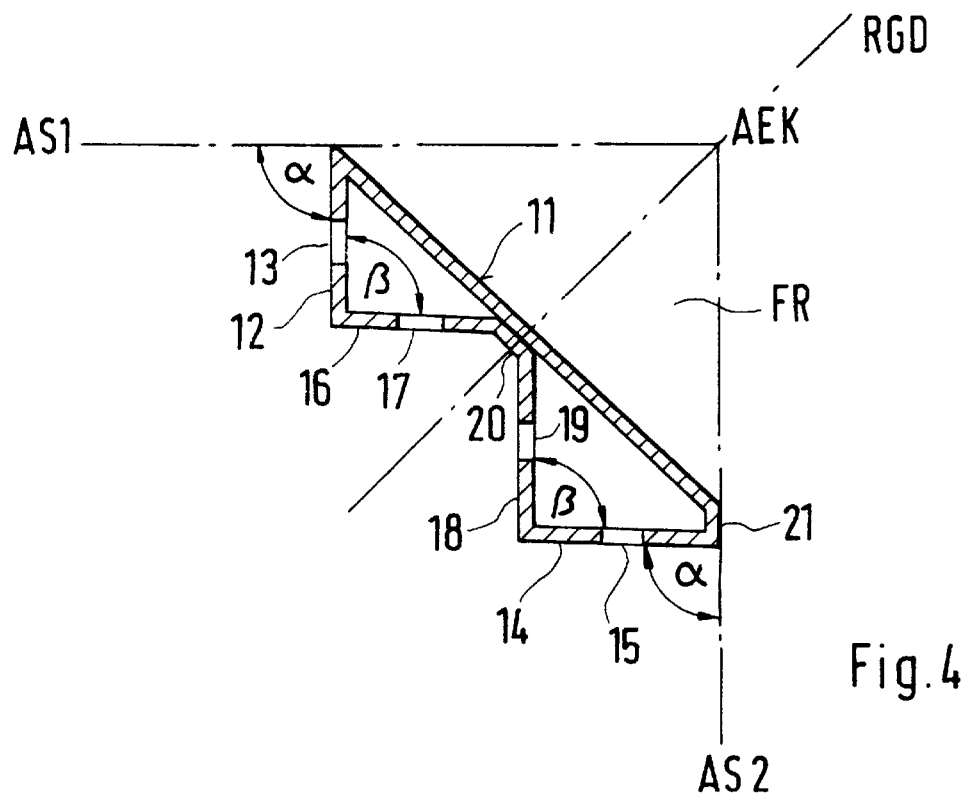

In the practical example according to FIG. 4 the fastening sections 12 and 14 are perpendicular to the facing outsides AS1 and AS2 and the section sides 16 and 18 are perpendicular to the fastening sections 12 and 14, for example, α=β=90°. It is recommended that the spacings of the fastening mounts 13, 15, 17 and 19 to the corresponding inside edge IK1 and IK2 be chosen equally large. The section sides 16 and 18 can then be directly connected to each other or via the transition section 20 and/or connected to the connection section 11. The section outside can have a support section 21 which lies against the facing outside AS2 and assumes the transition from connection section 11 of the section outside to the fastening section 14 of the section inside.

Figure 5:
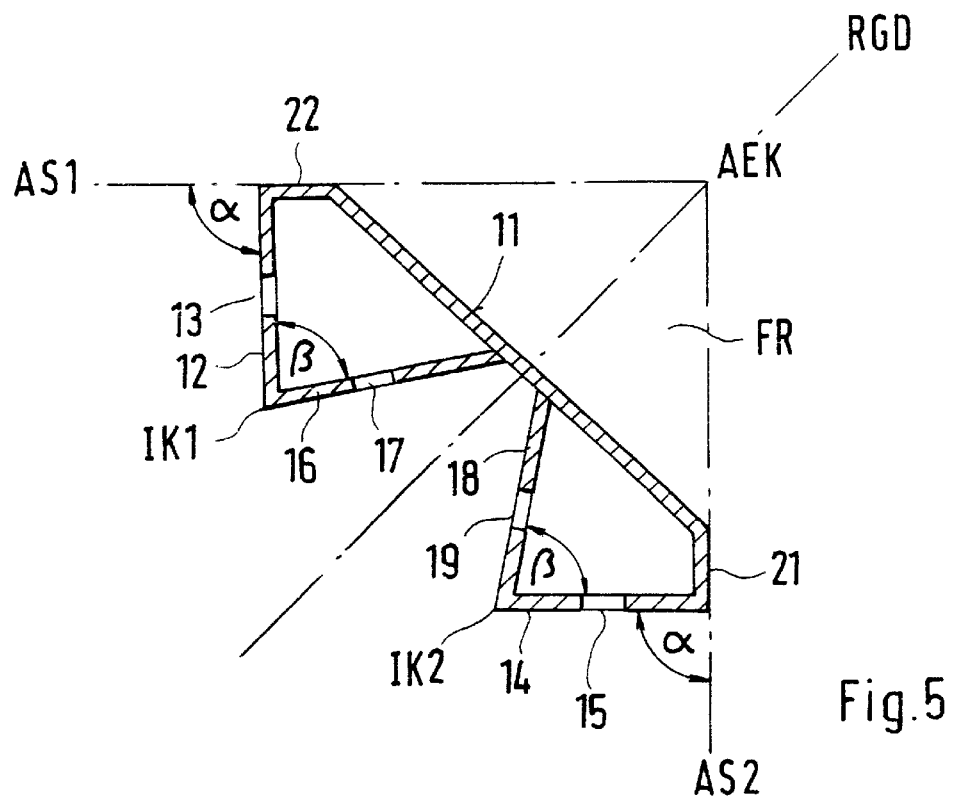

In the practical example according to FIG. 5 both ends of the connection section 11 grade into the fastening sections 14 and 12 of the section inside via support sections 21 and 22. The fastening sections 12 and 14 are perpendicular to the support sections 22 and 21, for example, α=90°. The section sides 16 and 18 are connected at an acute angle β to the fastening sections 12 and 14 and are directly connected to the connection section 11. The fastening mounts 13, 15, 17 and 19 have the same spacing from the corresponding inside edge IK1 or IK2.

Figure 6:
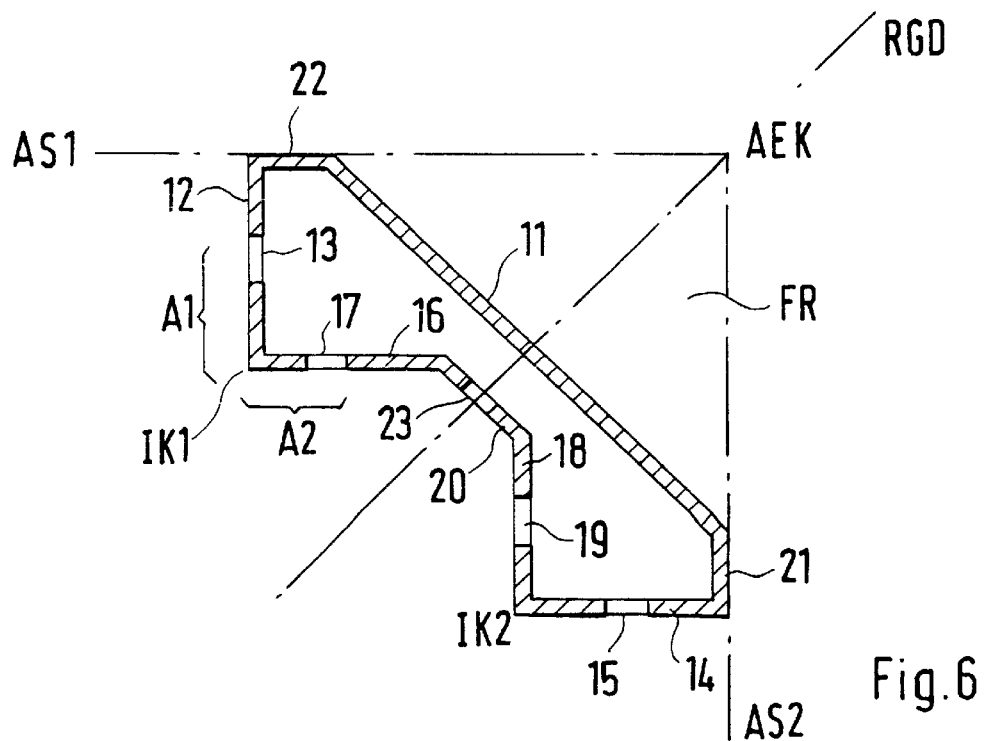

In the frame pieces according to FIG. 6 the section sides 16 and 18 are perpendicular to the fastening sections 12 and 14 being connected, for example, α=β=90°. The section sides 16 and 18 are connected to each other via the transition section 20, which runs at a spacing parallel to connection section 11 and can have additional fastening mounts 23. The widths of the fastening sections 12 and 14, as well as the section sides 16 and 18, can also be chosen equally large and the support connectors 21 and 22 can be dimensioned so that the transition section 20 or the section sides 16 and 18 can be directly connected to the connection section 11.

Figure 7:
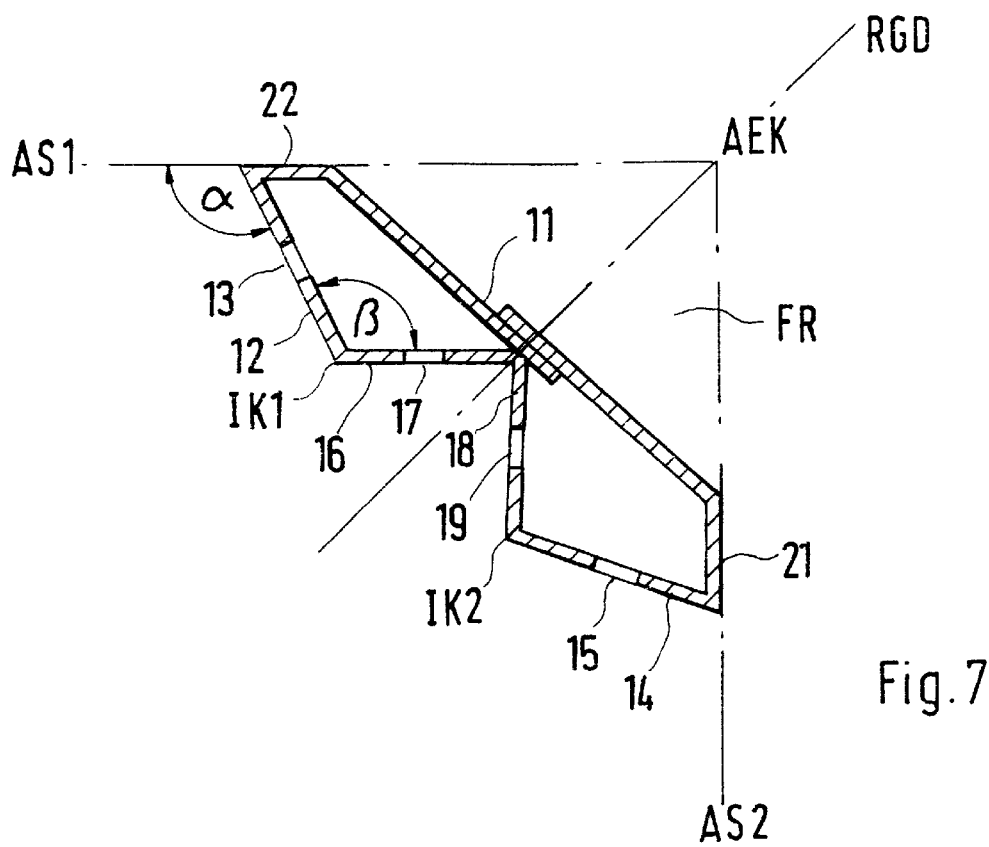

FIG. 7 shows a frame piece in which the angles α and β are obtuse. The support sections 21 and 22 are adjusted so that the connected section sides 16 and 18 are at least supported on the connection section 11 or can be connected to it. The connection section 11 can be joined and overlapped in the region of the support or connection site.

Figure 8:
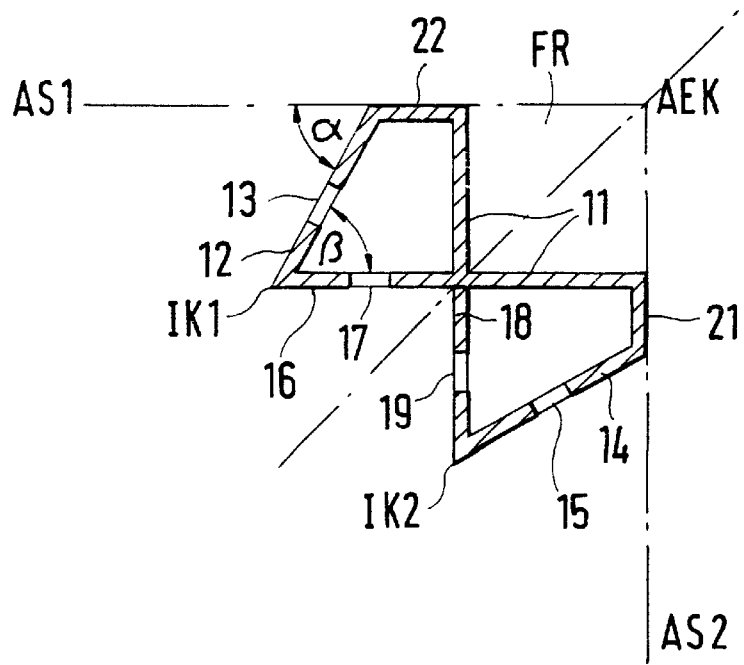

As shown in FIG. 8, the connection section 11 need not run linearly and can also be designed step-like or run in any desired manner from the support sections 21 and 22, as long as there is sufficient free space FR to the outside corner edge AEK. The fastening sections 12 and 14 are at an acute angle α to the outsides AS1 and AS2 and the sections sides 16 and 18 are connected at an acute angle β to the fastening sections 12 and 14. The section sides 16 and 18 are perpendicular to each other and run parallel to their corresponding outsides AS1 and AS2. The section sides 16 and 18 meet in the region of the rack diagonal RGD on the corner of the step-like connection section 11 and can be rigidly connected to the connection section 11.

As shown in FIG. 4, the cross section of the frame section both in the region of the section outside and in the region of the section inside need not necessarily be designed as having a mirror-image symmetry with respect to the rack diagonal RGD. Asymmetric designs are also conceivable, when special requirements are imposed on the fastening possibilities and fastening directions.

We claim:
1. A frame piece for a rack of a switching cabinet, comprising:
   a section outside formed as a connection section (11) between a plurality of outsides (AS1, AS2) of the rack that contact at right angles;
   a plurality of fastening sections (12, 14) of a section inside connected to the connection section (11) and having in a longitudinal direction of the connection section (11) a plurality of first fastening mounts (13, 15), the connection section (11) transitioning into a plurality of section sides (16, 18) having a plurality of second fastening mounts (17, 19);

the fastening sections (12, 14) positioned at a first angle (α) to the outsides (AS1, AS2) of the rack and the section sides (16, 18) positioned at a second angle (β) to one of the connected fastening sections (12 or 14); and the fastening sections (12, 14) and the section sides (16, 18) forming two inside edges (IK1, IK2) of the section inside, and the section sides (16, 18) connected to each other one of directly and via a transition section (20).

2. A frame piece according to claim 1, wherein the fastening mounts (13, 15) of the fastening sections (12,14) have a first equal spacing (A1) to the inside edges (IK1, IK2).

3. A frame piece according to claim 2, wherein the second fastening mounts (17, 19) of the section sides (16, 18) have a second equal spacing (A2) to the inside edges (IK1, IK2).

4. A frame piece for a rack of a switching cabinet, comprising:

a section outside formed as a connection section (11) between a plurality of outsides (AS1, AS2) of the rack that contact at right angles;

a plurality of fastening sections (12, 14) of a section inside connected to the connection section (11) and having in a longitudinal direction of the connection section (11) a plurality of first fastening mounts (13, 15), the connection section (11) transitioning into a plurality of section sides (16, 18) having a plurality of second fastening mounts (17, 19);

the fastening sections (12, 14) positioned at a first angle (α) to the outsides (AS1, AS2) of the rack and the section sides (16, 18) positioned at a second angle (β) to one of the connected fastening sections (12 or 14);

the fastening sections (12, 14) and the section sides (16, 18) forming two inside edges (IK1, IK2) of the section inside;

the fastening mounts (13, 15) of the fastening sections (12, 14) having a first equal spacing (A1) to the inside edges (IK1, IK2);

the second fastening mounts (17, 19) of the section sides (16, 18) having a second equal spacing (A2) to the inside edges (IK1, IK2); and the first spacings (A1) equal to the second spacings (A2).

5. A frame piece according to claim 4, wherein the section sides (16, 18) are joined to at least one of each other and the connection section (11).

6. A frame piece according claim 5, wherein the frame piece has a mirror-image symmetry with respect to a corresponding rack diagonal (RGD) of the rack.

7. A frame piece according to claim 6, wherein the first angle (α) is one of acute, right and obtuse.

8. A frame piece according to claim 7, wherein the second angle (β)is one of acute, right and obtuse.

9. A frame piece according to claim 8, wherein the transition section (20) is parallel to the connection section (11).

10. A frame piece according to claim 9, wherein the transition section (20) is connected to the connection section (11).

11. A frame piece according to claim 10, wherein the first and second fastening mounts (13, 15, 17, 19) of the fastening sections (12, 14) and the section sides (16, 18) are formed as holes.

12. A frame piece according to claim 11, wherein the first and second fastening mounts (13, 15, 17, 19) are positioned in the longitudinal direction of the section as a plurality of rows with uniform spacing in the fastening sections (12, 14) and the section sides (16, 18).

13. A frame piece according to claim 11, wherein the first fastening mounts (13, 15) of the fastening sections (12, 14) differ in at least one of design and spacing from the second fastening mounts (17, 19) of the section sides (16, 18).

14. A frame piece according to claim 13, wherein the fastening sections (12, 14) are positioned parallel to the section sides (18 or 16) and are separated.

15. A frame piece according to claim 9, wherein the transition section (20) has a plurality of third fastening mounts (23).

16. A frame piece according to claim 15, wherein the frame piece is designed as a part of an extruded section.

17. A frame piece according to claim 15, wherein the frame piece is formed as a stamp-bent part joined in a region of free edges of the section sides (16, 18).

18. A frame piece according to claim 15, wherein the frame piece is formed as a stamped-bent part joined in a region of the connection section (11).

19. A frame piece according to claim 1, wherein the second fastening mounts (17, 19) of the section sides (16, 18) have an equal spacing (A2) to the inside edges (IK1, IK2).

20. A frame piece for a rack of a switching cabinet, comprising:

a section outside formed as a connection section (11) between a plurality of outsides (AS1, AS2) of the rack that contact at right angles;

a plurality of fastening sections (12, 14) of a section inside connected to the connection section (11) and having in a longitudinal direction of the connection section (11) a plurality of first fastening mounts (13, 15), the connection section (11) transitioning into a plurality of section sides (16, 18) having a plurality of second fastening mounts (17, 19);

the fastening sections (12, 14) positioned at a first angle (α) to the outsides (AS1, AS2) of the rack and the section sides (16, 18) positioned at a second angle (β) to one of the connected fastening sections (12 or 14); and the fastening sections (12, 14) and the section sides (16, 18) forming two inside edges (IK1, IK2) of the section inside, and the section sides (16, 18) joined to at least one of each other and the connection section (11).

21. A frame piece according claim 1, wherein the frame piece has a mirror-image symmetry with respect to a corresponding rack diagonal (RGD) of the rack.

22. A frame piece according to claim 1, wherein the first and second fastening mounts (13, 15, 17, 19) of the fastening sections (12, 14) and the section sides (16, 18) are formed as holes.

23. A frame piece according to claim 1, wherein the first and second fastening mounts (13, 15, 17, 19) are positioned in the longitudinal direction as a plurality of rows with uniform spacing in the fastening sections (12, 14) and the section sides (16, 18).

24. (Amended) A frame piece for a rack of a switching cabinet, comprising:

a section outside formed as a connection section (11) between a plurality of outsides (AS1, AS2) of the rack that contact at right angles;

a plurality of fastening sections (12, 14) of a section inside connected to the connection section (11) and having in a longitudinal direction of the connection section (11)

a plurality of first fastening mounts (13, 15), the connection section (11) transitioning into a plurality of section sides (16, 18) having a plurality of second fastening mounts (17, 19);

the fastening sections (12, 14) positioned at a first angle ($\alpha$) to the outsides (AS1, AS2) of the rack and the section sides (16, 18) positioned at a second angle ($\beta$) to one of the connected fastening sections (12 or 14); and the fastening sections (12, 14) and the section sides (16, 18) forming two inside edges (IK1, IK2) of the section inside, and the frame piece formed as a stamp-bent part joined in a region of free edges of the section sides (16, 18).

25. A frame piece for a rack of a switching cabinet, comprising:

a section outside formed as a connection section (11) between a plurality of outsides (AS1, AS2) of the rack that contact at right angles;

a plurality of fastening sections (12, 14) of a section inside connected to the connection section (11) and having in a longitudinal direction of the connection section (11) a plurality of first fastening mounts (13, 15), the connection section (11) transitioning into a plurality of section sides (16, 18) having a plurality of second fastening mounts (17, 19);

the fastening sections (12, 14) positioned at a first angle ($\alpha$) to the outsides (AS1, AS2) of the rack and the section sides (16, 18) positioned at a second angle ($\beta$) to one of the connected fastening sections (12 or 14); and the fastening sections (12, 14) and the section sides (16, 18) forming two inside edges (IK1, IK2) of the section inside, and the frame piece formed as a stamped-bent part joined in a region of the connection section (11).

* * * * *